Dec. 23, 1969  J. J. BECKERING ET AL  3,485,018
LAWN MOWER DECK HOUSING
Filed April 4, 1967  3 Sheets-Sheet 1
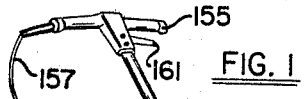
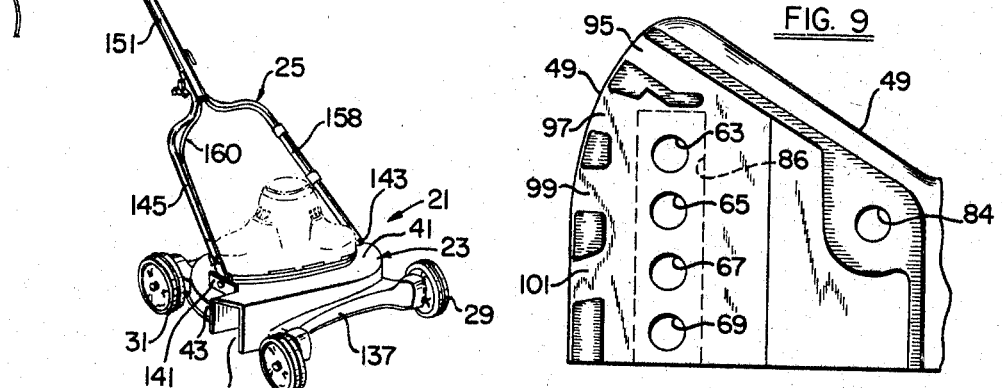
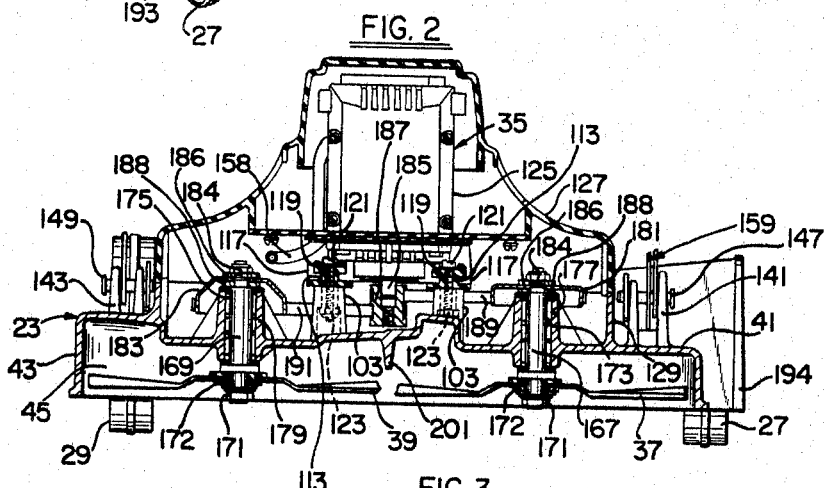
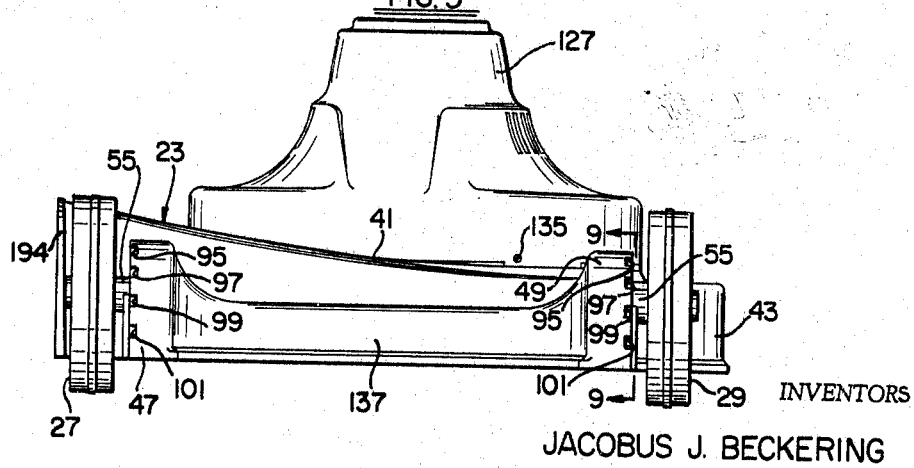
INVENTORS
JACOBUS J. BECKERING
RAYMOND J. DURAN
BY WILLIAM R. LESSIG III
Joseph R. Slotnik ATTORNEY

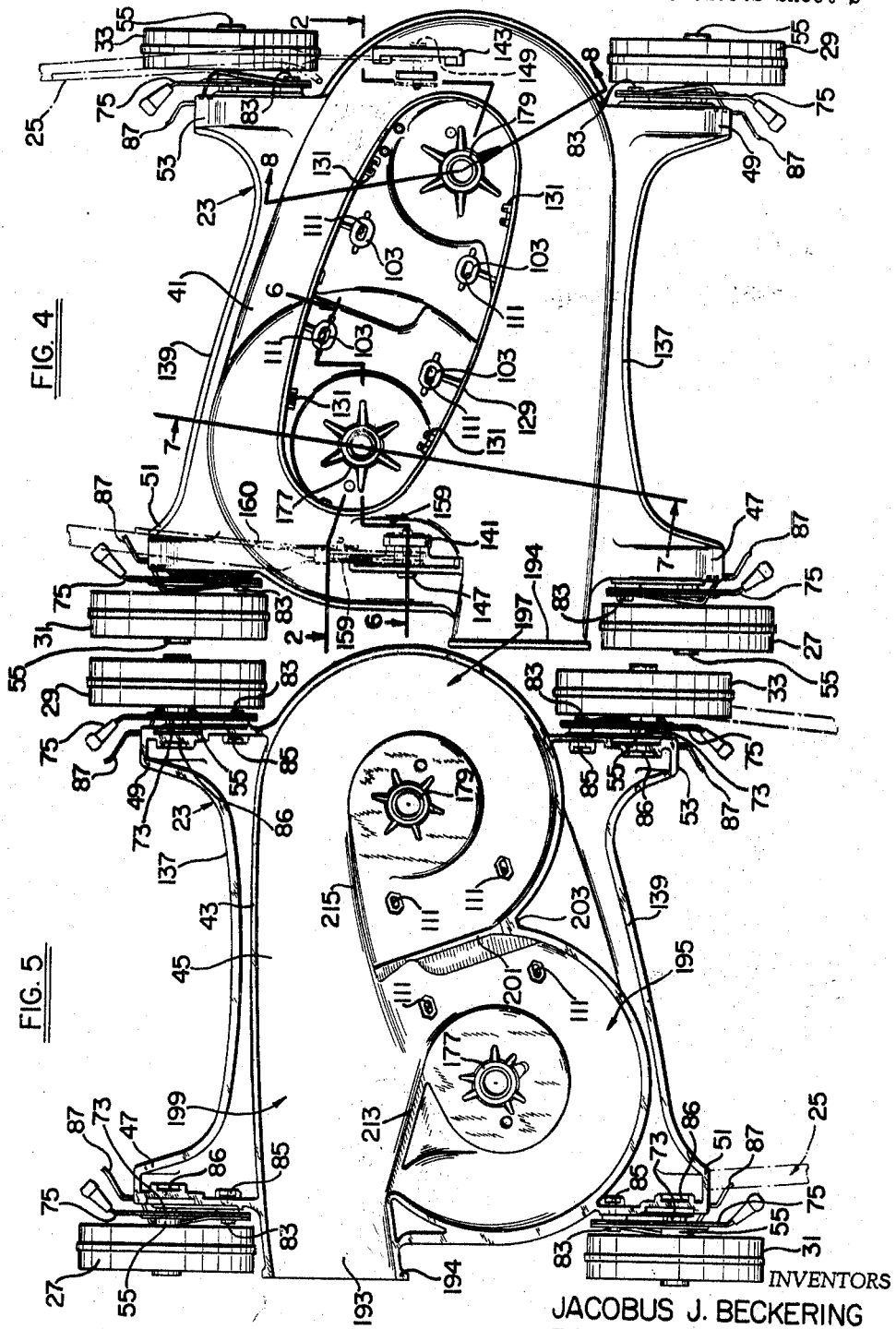

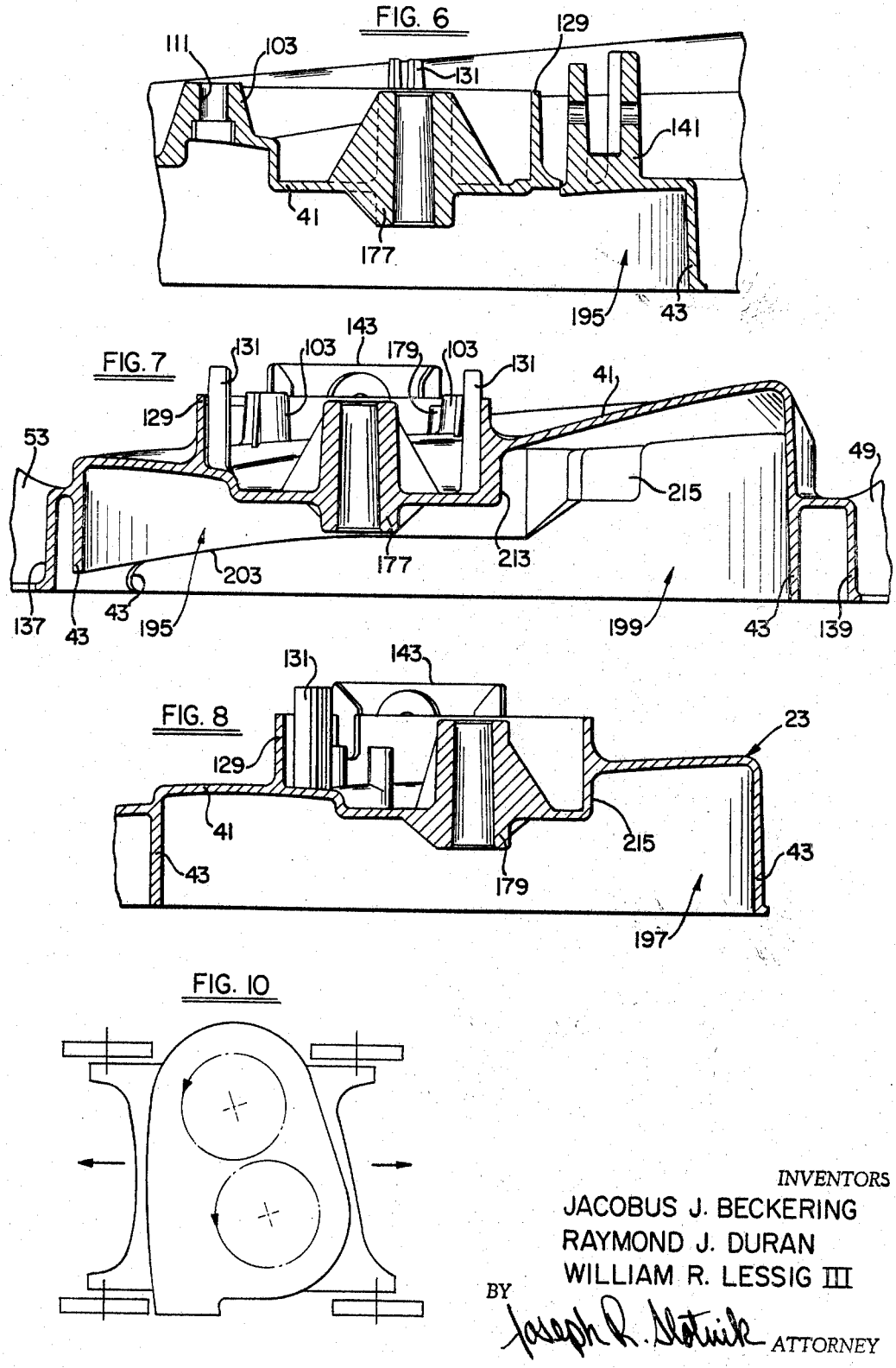

United States Patent Office 3,485,018
Patented Dec. 23, 1969

3,485,018
LAWN MOWER DECK HOUSING
Jacobus J. Beckering, Bel Air, Raymond J. Duran, Lutherville, and William R. Lessig III, Baltimore, Md., assignors to The Black and Decker Manufacturing Company, Towson, Md., a corporation of Maryland
Filed Apr. 4, 1967, Ser. No. 628,363
Int. Cl. A01d 55/18, 55/26
U.S. Cl. 56—25.4         35 Claims

ABSTRACT OF THE DISCLOSURE

In general, the mower hereinafter described is of the rotary blade, power driven type and includes a housing enclosing and supporting a plurality of cutting blades for rotation about parallel, generally vertical axes. An electric motor, supported atop the housing, is adapted to be connected to a suitable electric source, and rotatably drives the blades through a transmission. Ground engaging wheels adjustably support the housing for movement along the ground and a pivotal handle is mounted on the housing for control and manipulation of the mower.

BRIEF SUMMARY OF THE INVENTION

This invention relates generally to rotary power mowers, and particularly to an improved deck housing construction therefor.

The present invention relates to an improved housing construction for a mower of the rotary type, which construction is adapted to cooperate with a plurality of cutting blades to facilitate efficient mowing in both a forward and reverse longitudinal direction and which forms an efficiently operating and effective passage means for the removal of grass cuttings therefrom. Further, the housing construction is adapted to be integrally formed and has means integrated therewith to support a drive motor for the mower together with a manipulating handle and ground engaging wheels. Importantly, the housing of the present invention is constructed to satisfy all existing safety requirements and provides maximum protection for the operator.

Important objects of the present invention therefore are to provide an improved deck housing construction for rotary power mowers which construction encloses and supports a plurality of rotary mowing blades and cooperates therewith to facilitate efficient grass mowing both in a forward and reverse longitudinal direction, and which facilitates simplified, efficient and effective discharge of grass cuttings during use.

Another important object of the present invention is to provide an improved deck housing construction of the above character which provides an overall compact mower construction and facilitates unobstructed mowing along at least one side edge.

Still another object of the present invention is to provide an improved rotary mower deck housing construction having means integrated therewith which facilitates ready mounting of mower component parts thereon such as a drive motor, control handle and wheel adjustment components.

Still another object of the present invention is to provide an improved rotary mower deck housing construction which satisfies all ASA, UL and other mower safety standards and affords maximum safety to the operator.

Still another object of the present invention is to provide an improved rotary mower deck housing construction of the above character, capable of being integrally formed.

Other objects of the present invention are to provide an improved rotary mower deck housing construction of the above character which is relatively inexpensive to manufacture, light in weight, rugged in construction and reliable in use.

Further objects and advantages of the present invention will become more apparent from a consideration of the detailed description to follow taken in conjunction with the appended drawings.

DESCRIPTION OF THE DRAWINGS

FIG. 1 is a perspective view of a rotary mower embodying the present invention;

FIG. 2 is a transverse sectional view of the mower construction illustrated in FIG. 4 and taken along the line 2—2 thereof;

FIG. 3 is an enlarged front elevational view of the mower of FIG. 1;

FIG. 4 is an enlarged, top plan view of the mower of FIG. 1 shown with the motor removed for clarity;

FIG. 5 is an enlarged bottom plan view of the mower of FIG. 1 shown with the blades removed for clarity;

FIG. 6 is an enlarged sectional view of FIG. 4 taken along the line 6—6 thereof;

FIG. 7 is an enlarged sectional view of FIG. 4 taken along the line 7—7 thereof;

FIG. 8 is an enlarged sectional view of FIG. 4 taken along the line 8—8 thereof;

FIG. 9 is an enlarged view of the structure of FIG. 3 taken along the line 9—9 thereof; and FIG. 10 is a schematic illustration of the blade cutting swaths as related to the longitudinal path of mower movement.

BROAD STATEMENT OF THE INVENTION

Broadly described, the present invention includes a deck housing comprising a body having a top and a peripheral skirt, said body adapted to be moved in a longitudinal direction along the ground with said skirt in close proximity thereto, a plurality of blades disposed beneath said top within said skirt and rotatable about generally vertical axes to define cutting areas, a single discharge opening in said body, said body defining a transverse passageway communicating with said discharge opening, said body further defining a curved passageway adjacent the cutting area of each blade and communicating with said transverse passageway, the cross-sectional area of each of said curved passageways increasing in a direction toward said transverse passageway, the cross-sectional area of said transverse passageway increasing in a direction toward said discharge opening whereby cuttings from said blades are conveyed along said curved passageways and said transverse passageway and are discharged through said discharge opening.

In another aspect, the present invention includes an integral deck housing comprising an inverted, generally cup-shaped body defining a shielded, blade enclosing cavity adapted to travel in a longitudinal direction along the ground, said body having wheel supporting feet disposed adjacent opposite sides thereof, said body extending laterally beyond a pair of feet at one side of said body and having a plurality of frictionally driven blades rotatable therewithin through a plane generally parallel to the ground, power driven means, transmission means interconnecting said drive means and said blades, said blades defining cutting swaths which overlap in said longitudinal direction and form a continuous cutting swath across substantially the entire width of said body and laterally beyond said feet at one side of said body, said blades being constructed and arranged, independent of said transmission means, so as to prevent direct contact therebetween for any rotational position thereof.

In still another aspect, the present invention includes an integral deck housing comprising an inverted, generally cup-shaped body defining a shielded blade enclosing cavity adapted to travel in a longitudinal direction along the ground, said body having wheel supporting feet disposed adjacent opposite sides thereof, said body extending laterally beyond a pair of feet at one side of said body and having a plurality of frictionally driven blades rotatable therewithin through a plane generally parallel to the ground, said rotary blades defining a continuous cutting swath across substantially the width of said body and extending laterally beyond said feet at said one side of said body, and a single discharge opening in said body disposed in the side thereof opposite said one side.

In still another aspect, the present invention includes a deck housing comprising an inverted, integral, generally cup-shaped body adapted to travel in a longitudinal direction over the ground, said body having boss means on the upper side thereof, a drive motor supported upon and fixed to said boss means, a plurality of cutting blades rotatably disposed within said body and defining a continuous cutting path across substantially the entire lateral width of said body, transmission means interconnecting said motor and said blades, a single discharge opening in said body, unrestricted passage means in said body communicated with said discharge opening, said blades being constructed and arranged and said passage means overlaying a major portion of the cutting swaths of each of said blades and cooperable therewith to form a vacuum lift during blade rotation, said blades being effective to transmit cuttings along said unrestricted passage means and to and through said discharge opening.

In still another aspect, the present invention includes a deck housing comprising an inverted, generally cup-shaped, integral body adapted to be moved in a longitudinal direction over the ground, said body defining a shielded cavity and having rotatable blade means disposed wholly therewithin, means integral with said body supporting said blade means with the cutting portion thereof spaced from said body, wheel supporting feet formed integral with said body and extending outwardly therefrom, boss means formed integrally on the upper side of said body, a drive motor supported on said boss means, upwardly projecting handle support means formed integrally on the upper side of said body and on opposite sides of said boss means, and handle means pivotally mounted on said handle support means.

In still another aspect, the present invention includes a deck housing comprising an integral body having a top and a dependent skirt defining a protective blade cavity, said body being adapted to move in a longitudinal direction over the ground with said skirt in close proximity thereto, a plurality of rotatable blades disposed within said cavity and defining a continuous cutting path across substantially the entire width of said body, said body having volute channels formed therein overlaying a major portion of the cutting swaths of respective ones of said blades, said volute channels communicating with a discharge channel in said body, and a single discharge opening in said body at the terminal end of said discharge channel.

DETAILED DESCRIPTION

Referring now more specifically to the drawings, a rotary mower embodying the present invention is illustrated generally at 21 in FIG. 1 and is seen to include a deck housing 23 having an upstanding operating handle 25 mounted thereon and ground engaging wheels 27, 29, 31, 33 carried thereby. A drive motor 35 is mounted atop the deck housing 23 and rotatably drives a pair of cutting blades 37, 39 encased within and below the housing 23 (FIG. 2).

The deck housing 23, as seen best in FIGS. 2–5, comprises a top 41 and a dependent, generally peripheral skirt 43 integral therewith which together with the top 41 defines an inverted, generally cup-shaped body having a protective blade cavity 45. The housing 23 has a first pair of feet 47, 49, integral therewith and extending forwardly thereof, and a second pair of feet 51, 53 also integral with the housing extends rearwardly thereof. The feet 47, 51 are positioned toward one side of the deck housing 23 and the feet 49, 53 toward the other. The wheels 27, 29, 31, 33 are each journaled on an axle bolt 55 supported upon respective ones of the feet 47, 49, 51, 53.

Thus, in one form, the axle bolts 55 have reduced inner ends which extend through and are secured to adjusting levers 75 by nuts 73 (FIG. 5). The levers 75 are, in turn, pivotally secured to respective ones of the feet 47, 49, 51, 53 by shoulder bolts 83 which extend through openings 84 in the feet and are held in place by nuts 85. A detent spring lever 87 is pivoted on each of the shoulder bolts 83 and pivots conjointly with respective ones of the adjusting levers. The detent levers 87 are bent to cooperate with selected ones of vertically spaced notches 95, 97, 99, 101 formed in each of the feet 47, 49, 51, 53 so that by squeezing the outer end of the spring levers 87 toward the adjusting levers 75 and pivoting the two conjointly about the shoulder bolts 83, the vertical position of the wheels 27, 29, 31, 33 are adjusted relative to the deck housing 23 and the latter vertically relative to the ground.

In another form (FIG. 3), axle bolts for the wheels may have reduced ends positioned through selected ones of vertically spaced openings 63, 65, 67, 69 formed in each of the feet 47, 49, 51, 53, and held in place by nuts which fit into a pocket 86 on the back of each foot. However, the wheel adjustment construction, and particularly the interchangeable arrangement described briefly above, forms no part of the present invention and is not illustrated nor described in further detail here. For a better understanding thereof, reference may be made to the copending application of W. R. Lessig, III, et al., Ser. No. 628,438, filed Apr. 4, 1967, now Patent No. 3,428,328, issued Feb. 18, 1969, and owned by the assignee of the present invention.

The deck housing 23 is provided with a plurality of and preferably four upstanding bosses 103 formed atop the deck housing top 41 and integral therewith (FIGS. 2 and 4). Each of the bosses 103 has an elongated opening 111 which is adapted to align with elongated slots 113 in four dependent feet 117 formed integral with a motor housing 125. Slotted, channel shaped insulator feet 119 are fitted on each of the motor housing feet 117 and receive motor mounting bolts 121 which extend therethrough and through the boss openings 111 and are held in place by nuts 123. The boss openings 111 are elongated in a direction transverse to the direction of elongation of the slots 113 in the motor housing feet 117 and this facilitates easy centering of the motor 35 on the deck housing 23. A plastic shroud 127 encases and protects the motor 35 and is adapted to seat upon an elliptical lip 129 formed integral with the deck housing top 41. A plurality of bolts 135 extend through the shroud 127 and are threaded into nuts (not shown) trapped in channel shaped flanges 131 integral with the lip 129 to detachably secure the shroud in place.

As described above, the handle 25 is pivoted on the deck housing 23 to facilitate manipulation of the mower 21. To this end, laterally spaced, pairs of upstanding lug means 141, 143 are formed integral with the deck housing top 41 and are disposed one pair on either side of the elliptical lip 129. The handle 25 includes a lower, generally U-shaped portion 145 having its ends pivotally connected to the lug means 141, 143 by bolts 147, 149. An elongated, hollow post 151 is clamped to the portion 145 and has hand grips 155 secured thereto. A line cord 157 extends through the hand grips 155 and is connected to an on-off switch (not shown) and the latter is connected to the motor 35 by a motor cable 158 which extends through the hollow post 151, along one side of the handle portion 145 and through an opening in the shroud 127 to the motor 35. In addition, a handle latch lever 161 is carrried by the hand grips 155 and through a control cable 160 controls operation of a handle latch device 159 located at the lug means 141. This latch device 159 releasably locks the handle 25 relative to the deck housing 23 but permits selective repositioning of the handle for forward and reverse mower movement. However, this latch device 159 forms no part of the present invention, and is not described in detail here and for a full understanding thereof, reference may be made to the copending application of William R. Lessig, III, Ser. No. 629,727, filed Apr. 10, 1967, and owned by the assignee of the present invention.

According to one feature of the present invention, the deck housing 23, including the top 41, the skirt 43, the feet 47, 49, 51, 53, the bosses 103, the lip 129, the flanges 131 and the lug means 141, 143, is of integral construction and preferably is cast from a sturdy, light weight and durable material, such as, for example, aluminum or magnesium, so as to minimize both cost and weight of the mower as well as to simplify assembly thereof and increase its strength and resistance to vibration. Furthermore, this integral deck housing 23 provides the mower with an aesthetically pleasing, smooth appearance free of unnecessary and unsightly connectors. To further enhance the overall, smooth line appearance of the deck housing 23, the forward, wheel supporting feet 47, 49 are interconnected by an auxiliary skirt 137 integral therewith and the rear feet 51, 53 are similarly interconnected by an integral auxiliary skirt 139.

The mower 21 of the present invention is, as described briefly above, provided with a pair of mowing blades 37, 39 which are rotatable about generally vertically extending axes and are disposed wholly within the blade cavity 45. The blades 37, 39 are secured to spindles 167, 169 by nuts 171 and are insulated from both the spindles and nuts by insulator washer means 172 (FIG. 2). The spindles 167, 169 are rotatably supported by sets of permanently lubricated bearings 173, 175 in elongated bosses 177, 179, respectively, the latter being formed integral with the deck housing top 41. Alternatively, a single sleeve bearing could be substituted for each set of needle bearings and, in that case, suitable lubrication fittings could be provided at each boss 177, 179. The elongated configuration of the bosses 177, 179 in a vertical direction together with the long spindle bearing means 173, 175 provides sturdy support for the spindles throughout their length and particularly near the blades 37, 39 to withstand high impact and torsional loading thereon during use. In addition, the bosses 177, 179 locate the blades 37, 39 in spaced relation to the underside of the deck housing top 41 to provide blade clearance and prevent build-up of cuttings during mower use. The insulator washers 172 serve to insulate the blades 37, 39 from the spindles 167, 169 in the event the line cord 157 is cut.

As shown in FIG. 2, the spindles 167, 169 have pulleys 181, 183, respectively, secured at their upper ends by nuts 184. Each of the pulleys 181, 183 is located and stabilized by being held between two flat washers 186, 188. The motor 35 has a rotatable output shaft 185 positioned between the upper ends of the spindles 167, 169 and substantially parallel thereto. A drive pulley 187 is suitably keyed to the motor shaft 185 and has a pair of endless belts 189, 191 entrained thereover and over the pulleys 181, 183, respectively, so that the spindles 167, 169 and therefore the blades 37, 39 rotate upon energization of the motor 35. The drive pulley 187 is flanged and the driven pulleys 181, 183 are crowned to prevent the bolts 189, 191 from coming off during normal driving and heavy impact conditions.

In order to provide a continuous cutting path by the blades 37, 39, it is necessary that the swaths defined by the blades overlap in the longitudinal direction of travel of the mower 21 over the ground. If the blade swaths are in actual interference, it is necessary to time the rotation of the blades so that they will not contact each other causing damage to themselves and/or the motor. A number of present day mowers therefore employ a positive blade drive in the form of gears, timing belts, chains and sprockets or the like. These constructions are, however, relatively expensive and are subject to relatively high stresses which might result in premature failure during use. In addition, after the blades are removed, for example, for sharpening, it is necessary to exercise substantial skill and care when remounting the blades in place so that they will not contact each other during subsequent mower operation.

Furthermore, it has been the custom with rotary mowers employing a plurality of rotary blades to provide a plurality of discharge openings for the removal of grass cuttings. Quite often, one of these discharge openings is located at the rearward end of the mower so that some of the grass cuttings are discharged into the path of the mower operator and, more importantly, the operator is exposed to possible injury from stones, sticks or other hard objects which may be rapidly discharged through this opening. In addition, the use of two or more discharge openings for the grass cuttings makes it difficult if not impossible to employ a grass catcher for the cuttings.

Thus, according to another feature of the present invention, the blades are constructed and arranged to define a continuous cutting path across substantially the entire lateral width of the deck housing 23 and, in addition, the blades and the deck housing are constructed and arranged to develop an air flow pattern adapted to efficiently deliver grass cuttings to and through a single discharge opening in the housing, which opening greatly decreases potential danger to the operator during mowing and facilitates use of a grass catcher therewith.

As seen in FIGS. 4 and 5, the blade spindles 167, 169 are staggered or offset in the direction of mower travel and are spaced apart, in a direction transverse to the direction of mower travel, a distance less than the sum of the blade radii so that as the mower 21 is moved longitudinally, a continuous cutting path is defined in the blades 37, 39 (see also FIG. 10). The actual distance between the spindles 167, 169 is, however, slightly greater than the sum of the radii of the blades 37, 39. Thus, the blades 37, 39 are spaced from each other and are prevented from direct contact without relying on any timed relationship or positive drive transmission between the drive motor 35 and the spindles 167, 169. Furthermore, the spindles 167, 169 themselves require no positive interconnection all of which contributes to a relatively compact, light weight and inexpensive mower construction.

As described briefly above, the mower of the present invention facilitates mowing right up to at least one side edge of the mower and embodies a single discharge opening with multiple blades for removal of the grass cuttings. As shown in FIGS. 2–5, and perhaps more clearly in FIG. 10, the swath of the blade 39 extends between the feet 49, 53 and wheels 29, 33 and at least to and preferably slightly outwardly beyond the latter. The discharge opening for grass cuttings is illustrated at 193 and is formed by an interrupted portion of the deck housing skirt 43 along one side of the deck housing 23 (FIGS. 1 and 5). Preferably, the skirt ends adjacent the opening 193 are flared outwardly and the deck housing top 41 is extended outwardly slightly beyond the main part of the deck housing 23 so that the grass cuttings are discharged clear of the mower wheels 27, 31 adjacent thereto. The opening 193 is constructed so as to fall within the safety requirements set by ASA and is reinforced by a peripheral rib 194.

The grass cuttings from the blades 37, 39 are delivered to the discharge opening 193 by way of curved spiraling or volute passages 195, 197 which overlay a major portion of the cutting paths or swaths of the blades 37, 39, respectively, and by way of a discharge passage 199 communicating the volute passages 195, 197 and the discharge opening 193 (FIGS. 5–8). As shown in FIGS. 6–8, the volute passages 195, 197 are formed by spiral shaped depressions or recesses in the underside of the deck housing top 41. The discharge passage 199 similarly is formed by an elongated depression also in the deck housing top which depression extends substantially transversely to the direction of mower movement. The housing skirt 43 is curved at the sides and rear end thereof to conform closely to the swaths of the blades 37, 39 and a dependent flange 201 integral with the underside of the deck housing top 41 extends from an inwardly curved, generally V-shaped portion 203 of the skirt 43 and separates the passages 195, 197 (FIG. 5).

The volute passages 195, 197 increase in cross-sectional area in the direction of rotation of the blades 37, 39 and toward the area of communication with the discharge passage 199 (see FIGS. 5 and 10). Thus, the depth of the volute depressions in the deck housing top 41 forming these passages 195, 197 gradually increases in this direction. This is achieved by tapering the deck housing top 41 upwardly progressively along the volute passages 195, 197 toward the discharge passage 199. By way of example, a taper of about 0.0035 inches per degree in the deck housing top 41 has been found to develop a highly efficient air flow pattern in the passages to yield satisfactory results. Thus for volute passages 195, 197 of about 243° and 285°, this amounts to a total taper of about 0.850 and about 1.000 inches, respectively.

The blades 37, 39 have their leading edges sharpened and are gently curved upwardly from these portions toward the rear edge of the blades as defined by their direction of rotation. The blades 37, 39 are spaced from the deck housing top 41 so that during blade rotation, a vacuum or sub-atmospheric pressure condition is formed in the passages 195, 197 above the blades which lifts the grass for more even, thorough and in general better cutting performance. In addition, the blade curvature and movement and the volute and discharge passages sets up an air flow pattern in these passages which efficiently conveys the cuttings along the passages 195, 197 and moves them into the discharge passage 199 from which they are discharged through the opening 193.

The discharge passage 199 also increases in cross-sectional area toward the discharge opening 193 both by progressive deepening as well as progressively widening toward the discharge opening 193. The volute passage 195 blends into and forms the original of the discharge passage 199 while the terminal end of the volute passage 197 flows smoothly into the discharge passage substantially at its midpoint so that the grass cuttings are efficiently discharged from the volute passages 195, 197 to the discharge opening 193. The discharge passage 199 is bounded laterally by the skirt 43 and by substantially vertical shoulders 213, 215 on the housing top 41, the latter serving to prevent the cuttings in the discharge passage 199 from reentering the volute passages 195, 197, respectively.

As shown in FIG. 7, the skirt 43 tapers upwardly toward the V-shaped portion 203 so that when the mower moves in a left-hand direction, as seen in the figure, this portion of the skirt 43 passes easily over the grass without bending it severely and mowing by the blades 37, 39 is carried out with maximum efficiency. The auxiliary skirt 137 protects the blades 37, 39 at this area but is spaced sufficiently therefrom so as not to hinder or restrict mowing. When the mower moves in the opposite direction, the spacing of the skirt 43, at this end of the mower, from the blades 37, 39 is sufficient so that the grass blades can spring back and mowing thereof is not hampered.

The long bosses 177, 179 through which the blade spindles 167, 169 extend and which house the spindle bearings 173, 175, provide sufficient clearance between the blades 37, 39 and the deck top 41 to prevent clogging during use. In addition, the bosses 177, 179 accurately locate the blades 37, 39 vertically relative to the skirt 43 so that the latter extends below the bottom surface of the blades 37, 39 to prevent possible injury to the operator during use. Furthermore, the laterally facing discharge opening 193 insures that the cuttings are discharged away from the operator. The single discharge opening 193 facilitates use of the mower 21 of the present invention with or without a grass catcher assembly which can be mounted directly on the deck housing 23 at the opening 193. To this end, the peripheral rib 194 may serve to facilitate reception of the grass catcher assembly. One particular advantageous grass catcher assembly is illustrated and described in detail in the copending application of Raymond J. Duran, et al., Ser. No. 634,523, filed Apr. 28, 1967 and owned by the assignee of the present application, and since this assembly forms no part of the present invention, it is not illustrated nor described further here.

By the foregoing, there has been disclosed an improved deck housing construction for rotary power mowers calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In a rotary mower, a deck housing comprising a body having a top and a peripheral skirt, said body adapted to be moved in a longitudinal direction along the ground with said skirt in close proximity thereto, a pluralty of blades disposed beneath said top within said skirt and rotatable about generally vertical axes to define cutting areas, a single discharge opening in said body, said body defining a transverse passageway communicating with said discharge opening, said body further defining a curved passageway adjacent the cutting area of each blade and communicating with said transverse passageway, the cross-sectional area of each of said curved passageways increasing in a direction toward said transverse passageway, the cross-sectional area of said transverse passageway increasing in a direction toward said discharge opening, whereby cutting from said blades are conveyed along said curved passageways and said transverse passageway and are discharged through said discharge opening.

2. A construction as defined in claim 1 wherein adjacent ones of said blade cutting areas overlap in said longitudinal direction.

3. A construction as defined in claim 1 which includes a pair of blades rotatable about substantially parallel axes offset in said longitudinal direction, said axes being spaced in a transverse direction normal to said longitudinal direction a distance less than the combined radii of said blades.

4. A construction as defined in claim 1 wherein said discharge opening is disposed laterally of said body.

5. A construction as defined in claim 4 wherein said discharge opening is defined by an interrupted portion of said skirt.

6. A construction as defined in claim 1 wherein said body top and skirt are of integral construction.

7. A construction as defined in claim 1 wherein said passageway is formed in the underside of said top and by means integral therewith.

8. A construction as defined in claim 1 wherein said top defines a surface portion of said passages, said top being inclined slightly upwardly at least on its lower side in the direction of cross-sectional area increase of said passages.

9. A construction as defined in claim 1 wherein said curved passageways include volute passageways overlaying a major portion of the cutting areas of respective ones of said blades.

10. A construction as defined in claim 9 wherein said discharge passage is generally straight and intersects said volute passages.

11. A construction as defined in claim 9 wherein said blades rotate in the same direction about their respective axes, said discharge passage having its origin at the end of one of said volute passages remote from said discharge opening.

12. In a rotary mower, a deck housing comprising an inverted, integral, generally cup shaped body adapted to travel in a longitudinal direction over the ground, said body having boss means on the upper side thereof, a drive motor supported upon and fixed to said boss means, a plurality of cutting blades rotatably disposed within said body and defining a continuous cutting path across substantially the entire lateral width of said body, transmission means interconnecting said motor and said blades, a single discharge opening in said body, unrestricted passage means in said body communicated with said discharge opening, said blades being constructed and arranged and said passage means overlaying a major portion of the cutting swaths of each of said blades and cooperable therewith a form a vacuum lift during blade rotation, said blades being effective to transmit cuttings along said unrestricted passage means and to and through said discharge opening.

13. A construction as defined in claim 12 wherein said passage means increases in cross-sectional area toward said discharge opening.

14. A construction as defined in claim 12 wherein said passage means included volute passages overlaying a major portion of the cutting swath of respective ones of said blades and a discharge passage communicating each said volute passage and said discharge opening, each of said passages increasing in cross-sectional area toward said discharge opening.

15. A construction as defined in claim 12 wherein said passage means includes volute passages overlaying a major portion of the cutting swath of respective ones of said blades, each said volute passage being separated from an adjacent one thereof by means integral with said body.

16. In a rotary mower, a deck housing comprising an inverted, generally cup shaped, integral body adapted to be moved in a longitudinal direction over the ground, said body defining a shielded cavity and having rotatable blade means disposed wholly therewithin, means integral with said body supporting said blade means with the cutting portion thereof spaced from said body, wheel supporting feet formed integral with said body and extending outwardly therefrom, boss means formed integrally on the upper side of said body, a drive motor supported on said boss means, upwardly projecting handle support means formed integrally on the upper side of said body and on opposite sides of said boss means, and handle means pivotally mounted on said handle support means.

17. A construction as defined in claim 16 wherein said blade means includes at least a pair of rotary blades defining a continuous cutting path across substantially the entire width of said body, and a single discharge opening in said body facilitating discharge of the cuttings from said blades.

18. A construction as defined in claim 17 which includes vortex passage means overlaying at least a major portion of the cutting swaths of each said blade and communicated with said discharge opening.

19. A construction as defined in claim 17 which includes transmission means interconnecting said motor and said blades, said blades being constructed and arranged to prevent direct contact therebetween independent of said transmission means.

20. A construction as defined in claim 16 wherein a pair of wheel supporting feet are disposed adjacent each lateral side of said body, said body and blade means having a portion extending laterally beyond the pair of feet and wheels at one side of said body, and a discharge opening in said body in the lateral side thereof opposite said one side.

21. A construction as defined in claim 16 wherein said blade supporting means included boss means, shaft means extending through and rotatably supported by said boss means, said shaft means being fixed to said blade means and in driven relation to said motor.

22. A construction as defined in claim 21 which includes endless belt means frictionally interconnecting said motor and said shaft means.

23. A construction as defined in claim 21 wherein said blade means includes a pair of blades and said boss means and said shaft means includes a pair of bosses and a pair of generally parallel shafts, respectively, said shafts being spaced apart in a direction transverse to said longitudinal direction a distance less than the sum of the radii of said blades, said blades being constructed and arranged so as to prevent direct contact therebetween for any rotative position thereof independent of the driven relation of said shafts with said motor.

24. A construction as defined in claim 23 wherein said motor and said shafts are frictionally interconnected by endless belt means.

25. In a rotary mower, a deck housing comprising an integral body having a top and a dependent skirt defining a protective blade cavity, said body being adapted to move in a longitudinal direction over the ground with said skirt in close proximity thereto, a plurality of rotatable blades disposed within said cavity and defining a continuous cutting path across substantially the entire width of said body, said body having volute channels formed therein overlaying a major portion of the cutting swaths of respective ones of said blades, said volute channels communicating with a discharge channel in body, and a single discharge opening in said body at the terminal end of said discharge channel.

26. A construction as defined in claim 25 which includes means integral with said body separating said volute channels.

27. A construction as defined in claim 25 wherein said skirt defines a portion of said volute channels and said discharge channels.

28. A construction as defined in claim 25 wherein said discharge opening is defined by an interrupted portion of said skirt.

29. A construction as defined in claim 25 wherein said volute channels increase in cross sectional area toward said discharge channel, and said discharge channel increases in cross-sectional area toward said discharge opening.

30. A construction as defined in claim 25 wherein the rotational axes of adjacent ones of said blades are spaced apart a distance at least slightly greater than the combined radii of said blades and are offset relative to each other in said longitudinal directions.

31. In a rotary mower, an integral deck housing comprising an inverted, generally cup-shaped body defining a shielded, blade enclosing cavity adapted to travel in a longitudinal direction along the ground, said body having wheel supporting feet disposed adjacent opposite sides thereof, said body extending laterally beyond a pair of feet at one side of said body and having a plurality of frictionally driver blades rotatable therewithin through a plane generally parallel to the ground, power drive means, transmission means interconnecting said drive means and said blades, said blades defining cutting swaths which overlap in said longitudinal direction and form a continuous cutting swath across substantially the entire width of said body and laterally beyond said feet at one side of said body, said blades being constructed and arranged, independent of said transmission means, so as to prevent direct contact therebetween for any rotational position thereof.

32. In a rotary mower, an integral deck housing comprising an inverted, generally cup-shaped body defining a shielded blade enclosing cavity adapted to travel in a longitudinal direction along the ground, said body having wheel supporting feet disposed adjacent opposite sides thereof, said body extending laterally beyond a pair of feet at one side of said body and having a plurality of frictionally driven blades rotatable therewithin through a plane generally parallel to the ground, said rotary blades defining a continuous cutting swath across substantially the width of said body and extending laterally beyond said feet at said one side of said body, and a single discharge opening in said body disposed in the side thereof opposite said one side.

33. A construction as defined in claim 32 wherein said body has vortex passage means overlaying at least a major portion of the cutting swaths of said blades, and discharge means communicating said vortex passage means and said discharge opening.

34. A construction as defined in claim 33 wherein said discharge passage includes a single passage disposed adjacent said vortex passage means and communicated therewith.

35. A construction as defined in claim 33 wherein said vortex and discharge passage means are formed by means integral with said body.

References Cited

UNITED STATES PATENTS

| 2,198,526 | 4/1940 | Cockburn | 56—25.4 |
| 2,898,723 | 8/1959 | Goodall | 56—25.4 |
| 2,926,478 | 3/1960 | Jepson | 56—25.4 |
| 2,948,544 | 8/1960 | Rowe et al. | 56—25.4 XR |
| 3,000,165 | 9/1961 | Lill | 56—25.4 |
| 3,077,065 | 2/1963 | Samways et al. | 56—25.4 |
| 3,178,872 | 4/1965 | Swindler | 56—25.4 |
| 3,245,209 | 4/1966 | Marek | 56—25.4 |

RUSSELL R. KINSEY, Primary Examiner

U.S. Cl. X.R.

56—255

Disclaimer 3,485,018.—*Jacobus J. Beckering*, Bel Air, *Raymond J. Duran*, Lutherville, and *William R. Lessig III*, Baltimore, Md. LAWN MOWER DECK HOUSING. Patent dated Dec. 23, 1969. Disclaimer filed June 9, 1972, by the assignee, *The Black and Decker Manufacturing Company*.

Hereby enters this disclaimer to claims 12, 13, 15, 16–28 inclusive, and 30–35 inclusive of said patent.

[*Official Gazette January 16, 1973.*]